Dec. 22, 1964   G. M. RAPATA   3,162,085
FASTENER STUD
Filed May 5, 1961
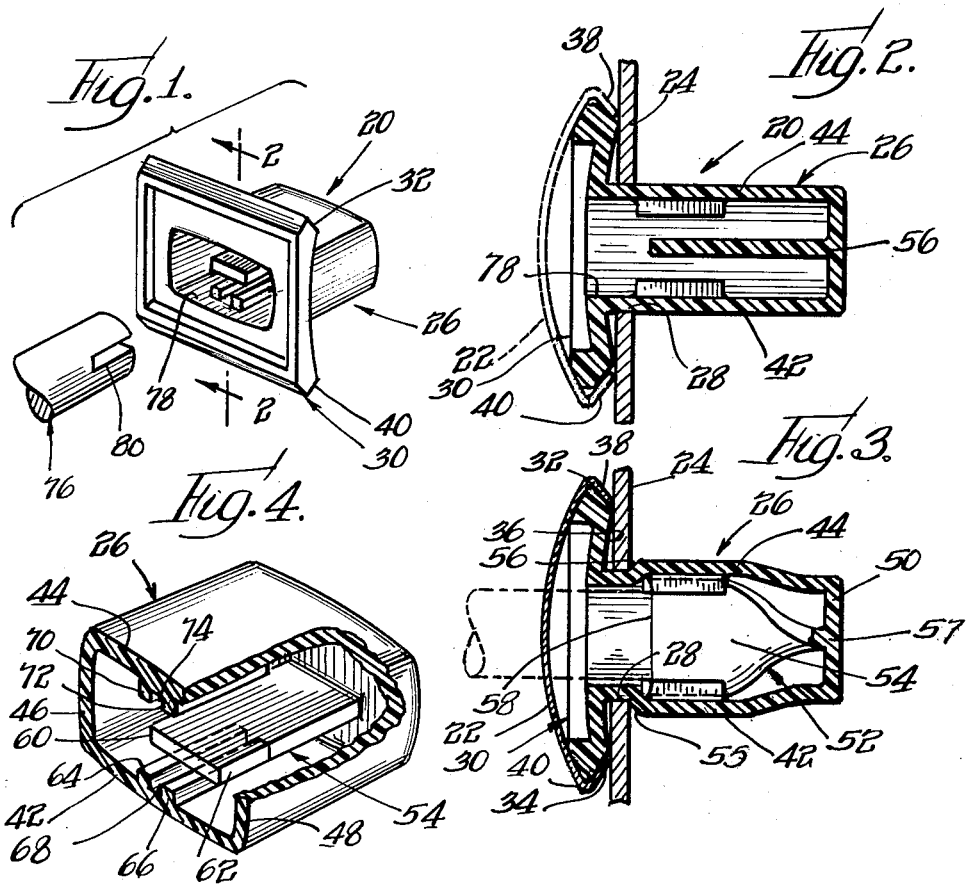
INVENTOR.
George M Rapata
BY:
Olson, Trexler
Wolters & Bushnell attys.

United States Patent Office 3,162,085
Patented Dec. 22, 1964

3,162,085
FASTENER STUD
George M. Rapata, Park Ridge, Ill., assignor to Illinois
Tool Works Inc., a corporation of Delaware
Filed May 5, 1961, Ser. No. 108,110
4 Claims. (Cl. 85—63)

The present invention relates to a novel fastening device or anchor member, and more specifically, to novel fastening devices or anchor members suitable for application to an aperture work structure from one side thereof.

An important object of the present invention is to provide a novel anchor member or fastening device of resilient or deformable material which may be easily and securely applied to an apertured work structure from one side thereof and which may be economically produced.

A further object of the present invention is to provide a novel anchor member or fastening device of the above described type having a portion which may be readily inserted into an aperture work structure and which is adapted to be expanded for sealing the work structure aperture.

A more specific object of the present invention is to provide a novel anchor member or fastening device of resilient or deformable material which is constructed so that a portion thereof may be readily inserted into a work structure aperture without undue forcing and subsequently expanded without hammering or otherwise applying forces which may cause injury to the work structure.

Still another object of the present invention is to provide a novel anchor member or fastening device of the above described type which is constructed so that it may repeatedly be applied to and removed from an apertured work structure without injury to the device or work structure.

Other objects and advantages of the present invention will become apparent from the following description and accompanying drawings therein:

FIG. 1 is a perspective view showing a device incorporating features of the present invention and an end portion of a tool adapted to be used in association with the device;

FIG. 2 is an enlarged sectional view taken along line 2—2 in FIG. 1, and further shows the device in an initial stage of assembly with an apertured work structure;

FIG. 3 is a partial sectional view similar to FIG. 2, but shows the device fully assembled with the apertured work structure;

FIG. 4 is a fragmentary perspective view partially broken away for showing features of the device in greater detail;

Referring now more specifically to the drawings wherein like parts are designated by the same numerals throughout the various figures, a device 20 incorporating features of the present invention is shown in FIGS. 1-4. The device 20 in this embodiment is preferably molded in one piece from a tough deformable and resilient plastic material such as nylon. While the device 20 may be modified so as to serve various functions, the embodiment shown is particularly adapted for fastening or anchoring a channel shaped molding strip 22 with respect to an apertured work structure or panel 24.

The device 20 is provided with an axially extending shank portion 26 adapted to extend through an aperture 28 in the work structure or the panel 24. A laterally or radially extending head portion 30 is integrally formed with a trailing end of the shank portion 26 for overlying the outer surface of the work structure and for cooperative engagement with the molding strip 22. In this embodiment the head portion 30 is provided with beveled margins 32 and 34 extending upwardly and outwardly from the back or clamping face 36 of the head portion. These beveled margins are respectively adapted to overlie and retain inturned marginal flanges 38 and 40 of the molding strip 22. It is to be understood that the head portion 30 may be adapted for cooperation with various work pieces other than the molding strip 22 and, if desired, the device 20 with or without a modified head portion could be used for securing a plurality of apertured work pieces together or with respect to the apertured panel or workpiece 24.

As shown best in FIGS. 2, 3 and 4, the shank portion 26 is hollow and comprises a relatively thin and flexible peripheral and axially extending wall structure including opposite sides or the wall sections 42–44 and 46–48. An end wall 50 is integrally formed with entering end extremities of the side walls 42–48 for closing the entering end of the shank portion.

As shown in FIGS. 1, 2 and 4, the shank portion 26 is formed so that it has a transverse cross section which is substantially uniform in size and shape throughout the length of the shank portion. Furthermore, the outer shape and dimensions of the shank portion 26 are similar to, but slightly smaller than the shape and dimensions of the aperture 28 through the work structure 24, so that the shank portion may be readily inserted to aperture without any need for pounding or forcing which might cause injury to the work structure.

In accordance with a feature of the present invention the device 20 is provided with means 52 for expanding side walls of shank portion behind the work structure or panel 24 as shown in FIG. 3 so as to provide shoulders 55 and 56 cooperable with head portion 30 for securing the device with respect to the work piece or panel 24. The means 52, in this embodiment, comprises an elongated flattened or blade like strut element 54 integrally joined to the end wall 50 at 57. The strut element 54 is centrally located within the shank portion between opposite sides 42 and 44 and extends from the end wall 50 toward, and adjacent to the head portion 30, but sufficiently short of the head portion so that the free terminal end 58 of the element 54 would be located entirely through and beyond the work structure or panel 24 when the device is fully applied to the work structure as shown in FIG. 3. While the strut element is relatively thin, in one direction, it is provided with a substantial width between longitudinal edges 60 and 62 thereof which width is materially greater than the distance between inner surfaces of the opposite side walls 42 and 44. In this embodiment the element 54 is formed from the same resilient deformable material as the remainder of the device 20, so that it may be twisted about its longitudinal axis from its normal position shown in FIGS. 2 and 4, in which it is substantially parallel to the side walls 42 and 44 to a position disposed transversely of the wall sections 42 and 44 as shown in FIG. 3. Thus, the side walls 42 and 44 may be readily expanded without pounding and without applying axially directed forces to the device 20 which might dent or otherwise injure the workpiece 24, particularly if the workpiece 24 is a relatively thin panel, by twisting the element 54 so that it becomes wedged between the side walls 42 and 44 as shown in FIG. 3.

While in certain instances the wedging action between the twisted element 54 and the resilient expanded side walls 42 and 44 may be sufficient to retain the strut element and the twisted condition the device 20 is preferably provided with means for positively retaining the strut element 54 in the twisted position. This means comprises a first pair of ribs 64 and 66 integrally formed with the side wall 42 and defining a slot 68 therebetween and a second pair of essentially identical ribs 70 and 72 disposed in opposing relationship and integrally formed with the side wall 44. The ribs 70 and 72 also define a slot or groove 74 therebetween. As shown in FIGS. 2 and 3, the ribs 64–66 and 70–72 extend along inner surfaces of the side walls 42 and 44 from points adjacent to, but axially spaced from the head portion 30 to points adjacent, but preferably short of the middle of the strut element 54.

In order to secure device 20 with respect to the work structure, a screwdriver-like tool 76 is preferably provided, a portion which is shown in FIGS. 1 and 3, which tool includes an elongated shank adapted to be inserted through an opening 78 in the head portion 30 and having a slot 80 therein, adapted to receive an end portion of the strut element 54 as shown in FIG. 3. With the aid of this tool, the strut element may quickly and easily be twisted from its normal position shown in FIGS. 2 and 4 to the position shown in FIG. 3. During this twisting movement, the opposite side walls 42 and 44 will expand sufficiently to enable the margins of a substantial free end portion of the strut element 54 to snap into the grooves or slots 68 and 74, so that the strut element will be positively locked in the twisted condition and the device 20 will be positively secured with respect to the work structure or panel. However, it is further to be noted that the device may be removed from the work structure, if desired, and without injury thereto simply by utilizing the tool 76 for applying a twisting force to the strut element, which is sufficient to cause the margins thereof to disengage from the grooves 68 and 74. After the strut element has been disengaged in this manner, the resiliency of the plastic will cause the opposite side walls 42 and 44 to return substantially to their original or normal condition, so that the device may be readily withdrawn from the work structure aperture.

As indicated above, the shank portion in its normal condition substantially fills the aperture 28 in the work structure or panel. When the shank is expanded, the side walls thereof are urged into sealing engagement with the edges of the work structure aperture, and since the side walls and the end wall are imperforate, the work structure aperture is effectively sealed.

It is obvious that many structural details may be changed without departing from the spirit and scope of the appended claims.

The invention is claimed as follows:

1. A fastening device comprising a resiliently transversely expandable plastic shank portion insertable through an aperture in a work structure, a head portion integrally joined to a trailing end of said shank portion and projecting laterally from the shank portion for overlying one side of the work structure, said shank and head portion having an axially extending opening therein, said shank and head portions having internal cross sectional configurations of substantially the same size and shape, said internal cross sectional configuration having a first predetermined transverse dimension, said shank and head portions joining each other at a circumferentially continuous junction and said shank portion having circumferentially continuous walls extending axially from said junction to an integral closed end remote from said head portion, said shank portion having an exterior transverse cross section having its maximum dimensions adjacent said junction and similar to and not substantially greater than corresponding dimensions of the aperture in the work structure for facilitating easy insertion of the shank portion through the aperture, and substantially filling the aperture, and a twistable resilient expansion element integrally secured to said closed end in said opening and having a first transverse dimension in one direction greater than said first predetermined transverse dimension of said opening and a second transverse dimension in a second direction less than said first predetermined transverse dimension of said opening for enabling the expansion element to be twisted within said opening for expanding the shank portion behind a work structure during assembly of the device with the work structure, said expansion element being located substantially entirely within said shank portion and avoiding axially directed engagement with said head portion.

2. A fastening device, as defined in claim 1, wherein said expansion element comprises a blade like strut element adapted to be wedged between opposite sides of said shank portion.

3. A fastening device, as defined in claim 2, which includes means defining groove means at said opposite sides of the shank portion for receiving margins of said blade like strut element and retaining the strut element in position for expanding the shank portion.

4. A fastening device, as defined in claim 1, wherein said expansion element is disposed for rotation about a central longitudinal axis of said shank portion.

References Cited by the Examiner

UNITED STATES PATENTS

| | | |
|---|---|---|
| 777,100 | 12/04 | Hoerr et al. |
| 2,117,832 | 5/38 | Wellner. |
| 2,933,794 | 4/60 | Biesecker _____ 24—216 |
| 2,997,910 | 8/61 | Tinnerman. |

EDWARD C. ALLEN, *Primary Examiner.*

CARL W. TOMLIN, *Examiner.*